United States Patent
Jiang et al.

(10) Patent No.: US 9,998,188 B2
(45) Date of Patent: Jun. 12, 2018

(54) SIGNAL TRANSMISSION APPARATUS AND DOWNLINK SIGNAL TRANSMISSION METHOD

(71) Applicant: Huawei Technologies Co., Ltd., Shenzhen (CN)

(72) Inventors: Yajun Jiang, Shanghai (CN); Jinlin Zhang, Shanghai (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 0 days. days.

(21) Appl. No.: 15/331,300

(22) Filed: Oct. 21, 2016

(65) Prior Publication Data

US 2017/0041054 A1    Feb. 9, 2017

Related U.S. Application Data

(63) Continuation of application No. PCT/CN2014/075959, filed on Apr. 22, 2014.

(51) Int. Cl.
| | |
|---|---|
| H04B 7/04 | (2017.01) |
| H04W 72/04 | (2009.01) |
| H04B 7/0456 | (2017.01) |
| H04B 7/06 | (2006.01) |

(52) U.S. Cl.
CPC ........... *H04B 7/0456* (2013.01); *H04B 7/06* (2013.01); *H04W 72/042* (2013.01); *H04W 72/0453* (2013.01)

(58) Field of Classification Search
CPC .. H04B 7/0617; H04B 7/0413; H04B 7/0634; H04L 2025/03426
See application file for complete search history.

(56) References Cited

U.S. PATENT DOCUMENTS

| | | | |
|---|---|---|---|
| 7,907,512 B1 * | 3/2011 | von der Embse | H04J 13/0048 370/208 |
| 2003/0231606 A1 | 12/2003 | Wu et al. | |
| 2006/0093065 A1 * | 5/2006 | Thomas | H04B 7/0426 375/299 |
| 2008/0107195 A1 | 5/2008 | Kishigami et al. | |
| 2010/0158151 A1 * | 6/2010 | Krauss | H04B 7/0413 375/267 |
| 2011/0044402 A1 | 2/2011 | Yang et al. | |
| 2013/0076566 A1 | 3/2013 | Jiang et al. | |

FOREIGN PATENT DOCUMENTS

| | | |
|---|---|---|
| CN | 1399425 A | 2/2003 |
| CN | 101997588 A | 3/2011 |
| CN | 103633452 A | 3/2014 |
| EP | 3067988 A1 | 9/2016 |
| JP | 2004120536 A | 4/2004 |
| JP | 2006211284 A | 8/2006 |

* cited by examiner

*Primary Examiner* — David S Huang
(74) *Attorney, Agent, or Firm* — Slater Matsil, LLP (57) ABSTRACT

Embodiments provide a signal transmission apparatus and a downlink signal transmission method. A downlink common channel signal that needs to be sent by using a wide beam is divided into multiple groups of grouped signals; for each group of grouped signals, signal weighting is separately performed on different radio frequency paths in a multi-antenna system; weighted grouped signals are combined to obtain a weighted downlink common channel signal; and the weighted downlink common channel signal is transmitted.

18 Claims, 4 Drawing Sheets

SIGNAL TRANSMISSION APPARATUS AND DOWNLINK SIGNAL TRANSMISSION METHOD

CROSS-REFERENCE TO RELATED APPLICATIONS

This application is a continuation of International Application No. PCT/CN2014/075959, filed on Apr. 22, 2014, the disclosure of which is hereby incorporated by reference in its entirety.

TECHNICAL FIELD

Embodiments of the present invention relate to the field of communications technologies, and in particular, to a signal transmission apparatus and a downlink signal transmission method.

BACKGROUND

To meet a requirement of a user equipment (UE) for an increasingly high data transmission rate, a multiple-input multiple-output (MIMO) technology is widely used in third generation (3G,) and next generation communications systems. A multi-antenna technology is an important constituent part of the MIMO technology.

Beams in different shapes and directions may be formed in space by performing weighting processing on a to-be-transmitted signal by using the multi-antenna technology, so as to adapt to demands on transmission of different signals. For example, a wide beam and a narrow beam may be formed through beamwidth division, where the wide beam may be used for transmitting a downlink signal, such as a downlink common channel signal. When the wide beam is used, beam transmission gains are small, and especially in a multi-antenna system with a relatively large-scale antenna array, coverage of transmitted signals is limited.

SUMMARY

Embodiments provide a signal transmission apparatus and a downlink signal transmission method, which can increase beam transmission gains and improve signal coverage capability.

According to a first aspect, an embodiment provides a signal transmission apparatus configured to transmit a downlink signal, where the downlink signal includes multiple downlink common channel signals. The transmission apparatus includes a signal dividing unit, configured to divide one downlink common channel signal in the multiple downlink common channel signals into N groups of grouped signals, where N represents a quantity of groups of grouped signals, and N≥2. The transmission apparatus also includes a signal weighting unit, configured to perform, according to a weight vector that corresponds to each group of grouped signals in the N groups of grouped signals, signal weighting on the group of grouped signals to generate N first weighted signals, where the weight vector is used for adjusting amplitudes and phases of each group of grouped signals, so that the N first weighted signals meet a wide-beam forming condition. The transmission apparatus includes a signal combining unit, configured to combine the N first weighted signals that correspond to the N groups of grouped signals to obtain a second weighted signal. The transmission apparatus also includes a transmit unit, including k parallel radio frequency subunits, where the transmit unit is configured to transmit the second weighted signal, k represents a quantity of radio frequency subunits, and k≥2.

In a first possible implementation manner of the first aspect, the weight vector includes components corresponding to the k radio frequency subunits, and that the signal weighting unit is configured to generate N first weighted signals includes generating N first weighted signals including k channels of first weighted sub-signals that correspond to the k radio frequency subunits.

With reference to the first possible implementation manner of the first aspect, in a second possible implementation manner of the first aspect, that the signal weighting unit is configured to generate N first weighted signals including k channels of weighted sub-signals that correspond to the k radio frequency subunits includes that: the k channels of first weighted sub-signals include at least one channel of effective first weighted sub-signal, the effective first weighted sub-signal includes an effective component, and the effective component includes a non-zero component in the weight vector or a component greater than a preset threshold.

With reference to the first aspect, or the first possible implementation manner of the first aspect, or the second possible implementation manner of the first aspect, in a third possible implementation manner of the first aspect, the radio frequency subunit is configured to transfer a second weighted sub-signal included in the second weighted signal.

With reference to any one of the foregoing possible implementation manners, in a fourth possible implementation manner of the first aspect, that the signal dividing unit is configured to divide one downlink common channel signal in the multiple downlink common channel signals into N groups of grouped signals includes: performing, according to a quantity of subcarriers occupied by the one downlink common channel signal, frequency domain division on the one downlink common channel signal to obtain the N groups of grouped signals.

With reference to the first aspect, or the first possible implementation manner of the first aspect, or the second possible implementation manner of the first aspect, or the third possible implementation manner of the first aspect, in a fifth possible implementation manner of the first aspect, that the signal dividing unit is configured to divide one downlink common channel signal in the multiple downlink common channel signals into N groups of grouped signals includes: performing phase deflection on the one downlink common channel signal for N times, where a downlink common channel signal obtained after each time of phase deflection is used as one group of grouped signals, so as to obtain the N groups of grouped signals.

With reference to any one of the foregoing implementation manners of the first aspect, in a sixth possible implementation manner of the first aspect, the apparatus further includes a digital-to-analog conversion unit configured to perform to-analog processing on the second weighted signal and send an obtained analog signal to the transmit unit.

According to a second aspect, an embodiment provides a signal transmission apparatus configured to transmit a downlink signal, where the downlink signal includes multiple downlink common channel signals, and the signal transmission apparatus includes a memory, a processor, and a transmission circuit, where the transmission circuit includes k parallel radio frequency paths, k represents a quantity of radio frequency paths, and k≥2; and the memory is configured to store instructions enabling the processor to perform the following operations: dividing one downlink common channel signal in the multiple downlink common channel signals into N groups of grouped signals, where N represents a quantity of groups of grouped signals, and N≥2; performing, according to a weight vector that corresponds to each group of grouped signals in the N groups of grouped signals, signal weighting on the group of grouped signals to generate first weighted signals, where the weight vector is used for adjusting amplitudes and phases of each group of grouped signals, so that the N first weighted signals meet a wide-beam forming condition; combining the N first weighted signals that correspond to the N groups of grouped signals to obtain a second weighted signal; and transmitting the second weighted signal.

In a first possible implementation manner of the second aspect, the weight vector includes components corresponding to the k radio frequency paths, and the memory is further configured to store an instruction enabling the processor to perform the following operation: generating N first weighted signals including k channels of first weighted sub-signals that correspond to the k radio frequency paths.

With reference to the first possible implementation manner of the second aspect, in a second possible implementation manner of the second aspect, the memory is further configured to store an instruction enabling the processor to perform the following operation: the k channels of first weighted sub-signals include at least one channel of effective first weighted sub-signal, the effective first weighted sub-signal includes an effective component, and the effective component includes a non-zero component in the weight vector or a component greater than a preset threshold.

With reference to the second aspect, or the first possible implementation manner of the second aspect, or the second possible implementation manner of the second aspect, in a third possible implementation manner of the second aspect, the radio frequency path is configured to transfer a second weighted sub-signal included in the second weighted signal.

With reference to any one of the foregoing possible implementation manners of the second aspect, in a fourth possible implementation manner of the second aspect, the memory is further configured to store an instruction enabling the processor to perform the following operation: performing, according to a quantity of subcarriers occupied by the one downlink common channel signal, frequency domain division on the one downlink common channel signal to obtain the N groups of grouped signals.

With reference to the second aspect, or the first possible implementation manner of the second aspect, or the second possible implementation manner of the second aspect, or the third possible implementation manner of the second aspect, in a fifth possible implementation manner of the second aspect, the memory is further configured to store an instruction enabling the processor to perform the following operation: performing phase deflection on the one downlink common channel signal for N times, where a downlink common channel signal obtained after each time of phase deflection is used as one group of grouped signals, so as to obtain the N groups of grouped signals.

With reference to any one of the foregoing possible implementation manners of the second aspect, in a fifth possible implementation manner of the second aspect, the apparatus further includes a digital-to-analog signal converter configured to perform to-analog processing on the second weighted signal and send an obtained analog signal to the transmission circuit.

According to a third aspect, an embodiment provides a user equipment. The user equipment includes a receiving unit, configured to receive a second weighted signal sent by a base station, where the second weighted signal is obtained by combining N first weighted signals. The N first weighted signals correspond to N groups of grouped signals, where the N groups of grouped signals are obtained by dividing one downlink common channel signal in multiple downlink common channel signals, N represents a quantity of groups of grouped signals, and N≥2; and the N first weighted signals are obtained by performing, according to a weight vector that corresponds to each group of grouped signals in the N groups of grouped signals, signal weighting on the group of grouped signals that corresponds to the weight vector, where the weight vector is used for adjusting amplitudes and phases of each group of grouped signals, so that the first weighted signals meet a wide-beam forming condition. The user equipment includes a processing unit, acquiring system information comprised in the second weighted signal.

According to a fourth aspect, an embodiment provides a user equipment. The user equipment includes a receiver, configured to receive a second weighted signal sent by a base station, where the second weighted signal is obtained by combining N first weighted signals. The N first weighted signals correspond to N groups of grouped signals, where the N groups of grouped signals are obtained by dividing one downlink common channel signal in multiple downlink common channel signals, N represents a quantity of groups of grouped signals, and N≥2. The N first weighted signals are obtained by performing, according to a weight vector that corresponds to each group of grouped signals in the N groups of grouped signals, signal weighting on the group of grouped signals that corresponds to the weight vector, where the weight vector is used for adjusting amplitudes and phases of each group of grouped signals, so that the first weighted signals meet a wide-beam forming condition. The user equipment also includes a processor, acquiring system information comprised in the downlink signal.

According to a fifth aspect, an embodiment provides a downlink signal transmission method that is applied to a multi-antenna system, where the multi-antenna system includes k parallel radio frequency paths, k represents a quantity of radio frequency paths, and k≥2. The method is used for transmitting a downlink signal, where the downlink signal includes multiple downlink common channel signals. The method includes dividing one downlink common channel signal in the downlink common channel signals into N groups of grouped signals, where N represents a quantity of groups of grouped signals, and N≥2. The method also includes performing, according to a weight vector that corresponds to each group of grouped signals in the N groups of grouped signals, signal weighting on the group of grouped signals to generate N first weighted signals, where the weight vector is used for adjusting amplitudes and phases of each group of grouped signals, so that the N first weighted signals meet a wide-beam forming condition. The method also includes combining the N first weighted signals that correspond to the N groups of grouped signals to obtain a second weighted signal. The method also includes transmitting the second weighted signal.

In a first possible implementation manner of the fifth aspect, the weight vector includes components corresponding to the k radio frequency paths, and the generating N first weighted signals includes generating N first weighted signals including k channels of first weighted sub-signals that correspond to the k radio frequency paths.

With reference to the first possible implementation manner of the fifth aspect, in a second possible implementation manner of the fifth aspect, the generating N first weighted signals including k channels of first weighted sub-signals that correspond to the k radio frequency paths includes: the k channels of first weighted sub-signals include at least one channel of effective first weighted sub-signal, the effective first weighted sub-signal includes an effective component, and the effective component includes a non-zero component in the weight vector or a component greater than a preset threshold.

With reference to the fifth aspect, or the first possible implementation manner of the fifth aspect, or the second possible implementation manner of the fifth aspect, in a third possible implementation manner of the fifth aspect, the transmitting the second weighted signal includes: transferring, by using a corresponding radio frequency path, a second weighted sub-signal included in the second weighted signal.

With reference to any one of the foregoing possible implementation manners of the fifth aspect, in a fourth possible implementation manner of the fifth aspect, the dividing one downlink common channel signal in the multiple downlink common channel signals into N groups of grouped signals includes: performing, according to a quantity of subcarriers occupied by the one downlink common channel signal, frequency domain division on the one downlink common channel signal to obtain the N groups of grouped signals.

With reference to the fifth aspect, or the first possible implementation manner of the fifth aspect, or the second possible implementation manner of the fifth aspect, or the third possible implementation manner of the fifth aspect, in a fifth possible implementation manner of the fifth aspect, the dividing one downlink common channel signal in the multiple downlink common channel signals into N groups of grouped signals includes: performing phase deflection on the one downlink common channel signal for N times, where a downlink common channel signal obtained after each time of phase deflection is used as one group of grouped signals, so as to obtain the N groups of grouped signals.

With reference to any one of the foregoing possible implementation manners of the fifth aspect, in a sixth possible implementation manner of the fifth aspect, before the transmitting the second weighted signal, further including: performing to-analog processing on the second weighted signal.

By using the downlink signal transmission apparatus and method provided in the embodiments of the present invention, a downlink common channel signal that needs to be sent by using a wide beam is divided into multiple groups of grouped signals; for each group of grouped signals, signal weighting is separately performed on different radio frequency paths in a multi-antenna system; weighted grouped signals are combined to obtain a weighted downlink common channel signal; and the weighted downlink common channel signal is transmitted, so that a transmit power of each radio frequency path in the multi-antenna system is fully used, thereby increasing transmission gains of a wide beam, further increasing the coverage of a downlink common channel signal, and improving the signal transmission effect.

DETAILED DESCRIPTION OF ILLUSTRATIVE EMBODIMENTS

To make the objectives, technical solutions, and advantages of the present invention clearer, the following further describes the implementation manners of the present invention in detail with reference to the accompanying drawings.

Technologies described in this specification may be applied to multiple types of communications systems, including 3G communications systems such as a Wideband Code Division Multiple Access (WCDMA) system and a Time Division-Synchronous Code Division Multiple Access (TD-SCDMA) system, and next generation communications systems such as a Long Term Evolution (LTE) communications system and systems subsequently evolved from the LTE communications system.

A method provided in the embodiments relates to a base station. The base station may be a node B in a WCDMA system, an evolved Node B (e-NodeB) in an LTE communications system, or a similar device in a communications system subsequently evolved from the LTE. Further, the method provided in the embodiments of the present invention may be executed jointly by a remote radio unit (RRU) and a passive antenna of a base station, may be executed jointly by a baseband unit (BBU) and a passive antenna of a base station, may be executed by an active antenna integrated with a function of a radio frequency part of a base station, or may be executed by another similar radio frequency function unit within a base station, which is not particularly limited in the embodiments.

The user equipment (UE) in the embodiments may be a user equipment that performs data transfer with the foregoing base station in a wireless manner, for example, a mobile phone or a personal computer with a wireless communication function.

Figure 1:
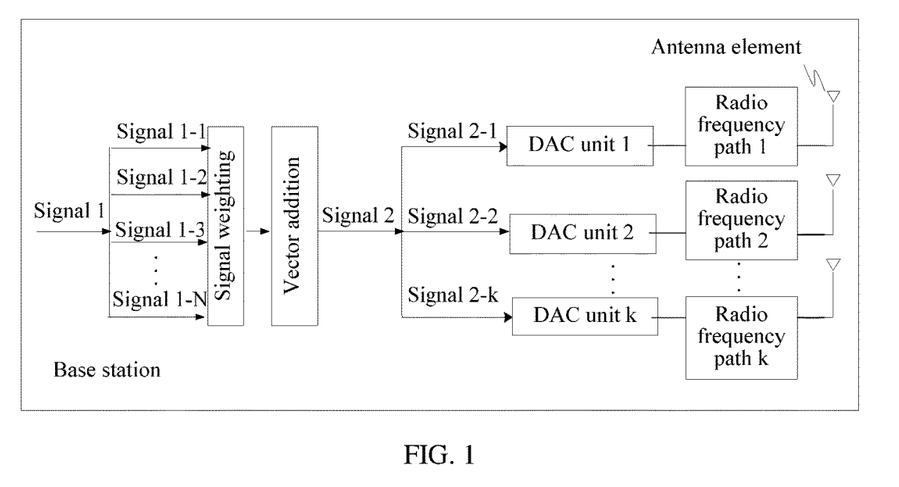
FIG. 1 is a schematic diagram of an application scenario according to an embodiment.

FIG. 1 is a schematic diagram of an application scenario of a downlink signal transmission method according to an embodiment. As shown in FIG. 1, the method is implemented in a base station. The base station includes k (K≥2) radio frequency paths. The radio frequency path refers to a transmit route for a signal within the base station and is used for performing processing such as filtering and amplification on a to-be-transmitted signal, and transferring a signal obtained after the above processing to an antenna element of the base station, which then transmits the signal to the air. The radio frequency path has a specific structure similar to that of an RRU path, and the details are not described in this embodiment of the present invention. Each radio frequency path separately drives a corresponding antenna element to perform signal transmission, and one radio frequency path may drive at least one antenna element. In FIG. 1, a one-driving-one configuration is described, one-driving-one indicates that one radio frequency path drives one antenna element, for example, four, eight, or sixteen columns of antennas may be configured for a base station, and accordingly, the base station may include four, eight, or sixteen radio frequency paths. Multiple radio frequency paths and multiple antenna elements corresponding to the multiple radio frequency paths may be collectively referred to as a multi-antenna system. The base station may further include k digital-to-analog conversion (DAC) units corresponding to the k radio frequency paths, namely, a DAC unit 1, a DAC unit 2, . . . , and a DAC unit k (k≥2) that are in FIG. 1.

In FIG. 1, a signal 1 is a downlink common channel signal and generated within the base station, and the signal 1 is divided into N groups of grouped signals, which are a signal 1-1, a signal 1-2, . . . , and a signal i-N (N≥2), according to a specific division method; weighting processing is separately performed on the signal 1-1, the signal 1-2, . . . , and the signal i-N according to weight vectors W1-1, W1-2, . . . , and Wi-N that correspond to the grouped signals, where the weight vectors are used for adjusting amplitudes and phases of the grouped signals, and the amplitudes and the phases may be determined according to a requirement for forming a signal into a wide beam. All the weight vectors W1-1, W1-2, . . . , and Wi-N are k-dimensional vectors and separately include components corresponding to k radio frequency paths; and vector addition is performed on the signal 1-1, the signal 1-2, . . . , and the signal i-N that have been weighted, so as to obtain a signal 2, where the signal 2 represents a weighted downlink common channel signal, the signal 2 includes sub-signals corresponding to the k radio frequency paths, namely, a signal 2-1, a signal 2-2, . . . , and a signal 2-k; the DAC unit 1, the DAC unit 2, . . . , and the DAC unit k respectively perform to-analog processing on the signal 2-1, the signal 2-2, . . . , and the signal 2-k, and obtained analog signals are transferred to antenna elements through corresponding radio frequency paths and transmitted to the air. The obtained analog signals are automatically superposed in the air to form a required wide beam.

It should be noted that, although a one-driving-one multi-antenna system is described in this embodiment, a person skilled in the prior art can easily conceive that the method and apparatus provided in this embodiment may be applied to other multi-antenna systems, for example, a two-driving-ten system and a four-driving-ten system, to achieve technical effects of this embodiment, where method processes or structures of apparatuses are similar, and therefore the details are not described herein again.

An embodiment provides a downlink signal transmission method. The method is applicable to a multi-antenna system, and the multi-antenna system includes k parallel radio frequency paths, where k represents a quantity of radio frequency paths, and k≥2.

The method may be used for transmitting a downlink signal, where the downlink signal may include multiple downlink common channel signals.

Specifically, a base station may send multiple downlink common channel signals to a UE simultaneously, the multiple downlink common channel signals may form a downlink signal or a part of the downlink signal, any one or more downlink common channel signals in the downlink signal may be processed by using the signal transmission method provided in this embodiment. In an actual application, the technical solution provided in this embodiment may be used for all or some of downlink common channel signals in a to-be-transmitted downlink signal, and the quantity or type of processed downlink common channel signals should not be construed as any limitation on the present invention. The downlink common channel signal may be, for example, a physical downlink control channel (PDCCH) signal, a physical control format indicator channel (PCFICH) signal, a physical hybrid ARQ indicator channel (PHICH,) signal, a physical broadcast channel (PBCH) signal, or the like, and the type of the downlink common channel signal is not particularly limited in the present invention. The UE may receive and parse a downlink common channel signal sent by the base station to acquire system information of an available network and to perform network access.

Figure 2:
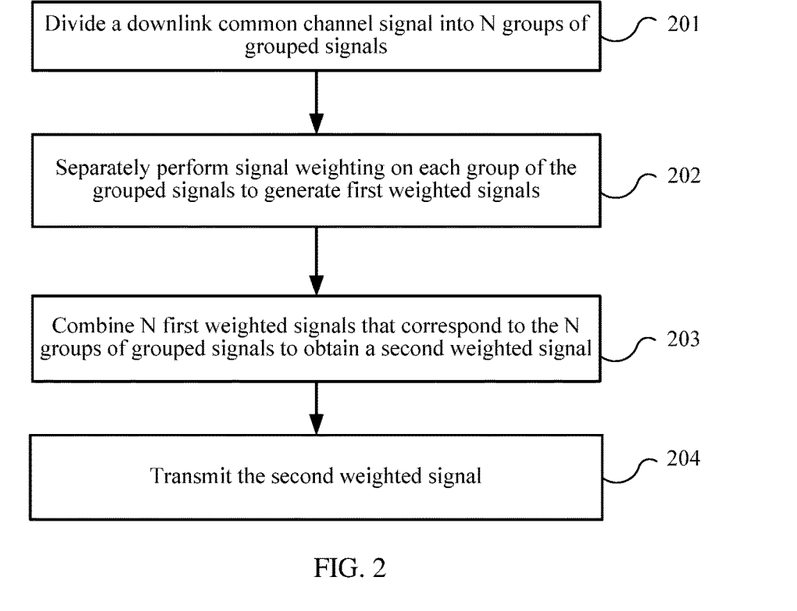
FIG. 2 is a flowchart of a downlink signal transmission method according to an embodiment.

The method may be executed by the base station and may include at least steps S201 to S204, and the process of the method is shown in FIG. 2.

S201: Divide one downlink common channel signal in multiple downlink common channel signals into N groups of grouped signals, where N represents a quantity of groups of grouped signals, and N≥2.

It is assumed that a downlink common channel signal is X. X may be divided into N groups (N≥2) and is expressed as $X=[x_1, \ldots, x_n]$ (1<n≤N). The N groups of grouped signals are used for representing the downlink common channel signal, that is, information of X can still be completely represented after the grouped signals are superposed, and after undergoing weighting processing, the N groups of grouped signals can enable all radio frequency paths of the system to transmit the N groups of grouped signals at full power. N may be set according to a parameter of the system, for example, considering a quantity of antennas of the system or a maximum transmit power; a maximum quantity of groups that can be supported is determined according to a signal processing capacity of the system; N may be self-adaptively adjusted within a specific range according to a running situation of the system.

S202: Perform, according to a weight vector that corresponds to each group of grouped signals in the N groups of grouped signals, signal weighting on the group of grouped signals to generate N first weighted signals, where the weight vector is used for adjusting amplitudes and phases of each of the grouped signals, so that the N first weighted signals meet a wide-beam forming condition.

A beam forming process is corresponding to a signal weighting process naturally, and a property of a beam depends on a weight vector for weighting. To ensure that all UEs within a cell can normally receive a downlink common channel signal, the downlink common channel signal may be sent by using a wide beam meeting a specific beamwidth requirement, for example, by using a wide beam with a beamwidth of 65 degrees. Specifically, selection of a weight vector is related to a setting and an attribute of an antenna array in the system. For example, different locations of antennas may lead to different physical properties of antennas or different shapes of formed beams. Therefore, a weight vector may be preset according to a beamwidth of a wide beam expected to be acquired. In addition, weight vectors used by groups of grouped signals may be the same or different, which may be determined according to an actual beam forming demand and is not particularly limited herein.

Selecting a weight value used for weighting for each group of grouped signals according to a wide-beam forming condition ensures that a divided downlink common channel signal can still form a wide beam after being transmitted to the air.

It is assumed that the downlink common channel signal after division is $X=[x_1, \ldots, x_n]$ (1<n≤N, and N≥2), and $y_n = w_1 \cdot x_n$ is obtained after weighting processing is performed on the grouped signal $x_n$, where $w_i$ is a weight vector, and $w_i = [w_i^1, w_i^2, \ldots, w_i^k]^T$ where $w_i^1, w_i^2, \ldots, w_i^k$ are components of weight vectors corresponding to first to kth radio frequency paths in the system, T represents a transpose of a matrix, i represents a serial number of the weight vector, i≥1, and $y_n$ is a k-dimensional vector (k≥2).

To be distinguished from a weighted signal corresponding to the entire downlink common channel signal, $y_n$ is referred to as a first weighted signal. $y_n$ includes k channels of first weighted sub-signals, that is, signal components of corresponding grouped signals after being weighted on the k radio frequency paths.

S203: Combine the N first weighted signals that correspond to the N groups of grouped signals to obtain a second weighted signal.

It is assumed that an $i^{th}$ group of grouped signals is $x_i$ ($i \geq 1$) and the first weighted signal obtained after weighting is $y_i$, where $y_i$ includes k channels of first weighted sub-signals that correspond to the k radio frequency paths. A combination process is specifically: on each radio frequency path, adding and combining the first weighted sub-signals included in $y_i$ and first weighted sub-signals, corresponding to the radio frequency path, of other weighted grouped signals to obtain the second weighted signal. That is, $Y=y_1+ \ldots +y_i+ \ldots +y_n$ ($1 < n \leq N$, and $N \geq 2$), where Y is a k-dimensional vector and represents a weighted downlink common channel signal. To be distinguished from a weighted signal of a grouped signal, Y is referred to as a second weighted signal. Y includes k channels of second weighted sub-signals that correspond to the k radio frequency paths, and the k channels of second weighted sub-signals each include an effective component.

S204: Transmit the second weighted signal.

After the foregoing signal division and weighting processes, the downlink common channel signal may be transmitted by using different antenna elements and superposed in the air to form a wide beam.

Optionally, before the transmitting the second weighted signal, the method may further include: performing to-analog processing on the second weighted signal, transferring obtained analog signals through the k radio frequency paths to an air interface and transmitting the obtained analog signals, where the obtained analog signals are naturally superposed in the air to form a wide beam, and the wide beam may be used for transmitting a downlink common channel signal and has relatively large signal coverage and relatively high beam gains.

In an actual application, a base station may simultaneously send multiple downlink common channel signals, and division and weighting processing may be performed on each downlink common channel signal by using the foregoing method. It is assumed that k channels of weighted sub-signals are generated after a common channel 1 is weighted by using a weight vector $w_1$. The k channels of weighted sub-signals and k channels of weighted signals of other downlink common channel signals may be added, then sent correspondingly to next k digital-to-analog conversion units and k radio frequency units, and finally transmitted through the air interface. That is, a signal that is finally transmitted through the air interface is a downlink signal including multiple weighted downlink common channel signals, and a beam formed in the air includes wide beams corresponding to different downlink common channel signals. Therefore, the method provided in this embodiment is applicable to various scenarios in which coverage of a downlink common channel signal that needs to be sent by using a wide beam is limited, for example, in a situation in which cell planning does not meet a requirement in a rural area or a suburban area, or a signal transmit power of a system is low, thereby having a wide range of application scenarios.

Optionally, as another embodiment, the k channels of first weighted sub-signals in S203 include at least one channel of effective first weighted sub-signal, where the effective first weighted sub-signal includes an effective component, and the effective component may include a non-zero component in the foregoing weight vector or a component greater than a preset threshold.

Specifically, using a multi-antenna system including 16 columns of antennas as an example, and for a grouped signal, a weight vector including effective components corresponding to four radio frequency paths may be selected for performing weighting, as shown in Table 1. An $i^{th}$ group of weighted grouped signals is marked as a first weighted signal $y_i$ ($i \geq 1$), where $y_1$ to $y_i$ may be distinguished by different radio frequency paths corresponding thereto, and each of effective components of $y_1$ to $y_i$ is corresponding to at least one radio frequency path in the k radio frequency paths. Still using a multi-antenna system (one-driving-one) with 16 columns of antennas as an example, a downlink common channel signal X is divided into $[x_1, x_2, x_3, x_4]$, weighted grouped signals are expressed as: $[y_1, y_2, y_3, y_4]=[w_1 \cdot x_1, w_2 \cdot x_2, w_3 \cdot x_3, w_4 \cdot x_4]$, where $w_1$, $w_2$, $w_3$, and $w_4$ are weight vectors. It is assumed that the weight vector $w_1$ of the signal $y_1$ has four effective components corresponding to $k_1$, $k_2$, $k_3$, and $k_4$ in the k radio frequency paths; the weight vector $w_2$ of the signal $y_2$ has four effective components corresponding to $k_5$, $k_6$, $k_7$, and $k_8$ in the k radio frequency paths; the weight vector $w_3$ of the signal $y_3$ has four effective components corresponding to $k_9$, $k_{10}$, $k_{11}$, and $k_{12}$ in the k radio frequency paths; and the weight vector $w_4$ of the signal $y_4$ has four effective components corresponding to $k_{13}$, $k_{14}$, $k_{15}$, and $k_{16}$ in the k radio frequency paths. It may be seen that, in the system, each radio frequency path in all the 16 radio frequency paths has a corresponding transmit power, and an effective component of a weight vector may have a full-scale amplitude; therefore, the radio frequency path may transmit a signal at full power.

TABLE 1

Example of selecting a weight vector for weighting a grouped signal Wide-beam weight vectors of four channels normalized according to 16 radio frequency paths at a maximum power on each channel

| Real part | Imaginary part |
| --- | --- |
| −0.0249856 | 0.0433011 |
| 0.25 | 0 |
| 0.25 | 0 |
| −0.0249856 | 0.0433011 |

In this embodiment, all antennas in the system can participate in a signal transmission process. Therefore, not only a downlink signal transmit power is increased, but also radio frequency resources of the system are fully used.

Optionally, as another embodiment, in S201, the downlink common channel signal may be divided by using multiple methods, and two optional manners are provided below.

Optionally, the dividing one downlink common channel signal into N groups of grouped signals includes: performing, according to a quantity of subcarriers occupied by the one downlink common channel signal, frequency domain division on the one downlink common channel signal to obtain the N groups of grouped signals.

For example, it is assumed that a downlink common channel signal X occupies 100 subcarriers in a frequency domain, and may be divided in the frequency domain division according to the subcarriers to obtain 10 groups, that is, $X=[x_1, x_2, \ldots, x_{10}]$, where each group includes some subcarriers of X, and quantities of subcarriers included in the groups of grouped signals may be the same or may be different as long as it is ensured that 10 groups of grouped signals together occupy all the 100 subcarriers of X. In addition, to ensure that grouped signals after undergoing weighting processing can enable all radio frequency paths of the system to transmit the grouped signals at full power, that is, weighting processing for a grouped signal may be performed on each radio frequency path; and subcarriers included in each group and subcarriers included in another group may be incompletely identical or completely different subcarriers, that is, at least some of grouped signals do not overlap.

Optionally, the dividing one downlink common channel signal into N groups of grouped signals includes: performing phase deflection on the downlink common channel signal for N times, where a downlink common channel signal obtained after each time of phase deflection is used as one group of grouped signals, so as to obtain the N groups of grouped signals.

For example, phase deflection at different angles is performed on a downlink common channel signal X, and a downlink common channel signal obtained after each time of phase deflection of X is used as a group of grouped signals, so that multiple groups of grouped signals may be generated. It is assumed that each time the phase is deflected by an angle $\theta$ ($-180°<\theta<180°$), where $\theta$ is a variable and a specific value of $\theta$ may be preset or may be self-adaptively determined according to a running situation of the system, which is not particularly limited herein. Because each time the phase is deflected by a different angle, different grouped signals are obtained after each time of phase deflection.

By using the foregoing frequency domain division or phase-change division method, large space can be utilized in terms of signal phase and frequency, and there are multiple candidate division forms, which can fully adapt to the structure and performance of the system, and achieve a good signal division effect.

The method provided in this embodiment is applicable to a multi-antenna system. A downlink common channel signal that needs to be sent by using a wide beam is divided into multiple groups of grouped signals; for each group of grouped signals, signal weighting is separately performed on different radio frequency paths; weighted grouped signals are combined to obtain a weighted downlink common channel signal; and the weighted downlink common channel signal is transmitted, so that a transmit power of each radio frequency path in the multi-antenna system is fully used, thereby increasing transmission gains of a wide beam, further increasing the coverage of the downlink common channel signal, improving the signal transmission effect, optimizing the system design, and avoiding waste of resources.

Figure 3:
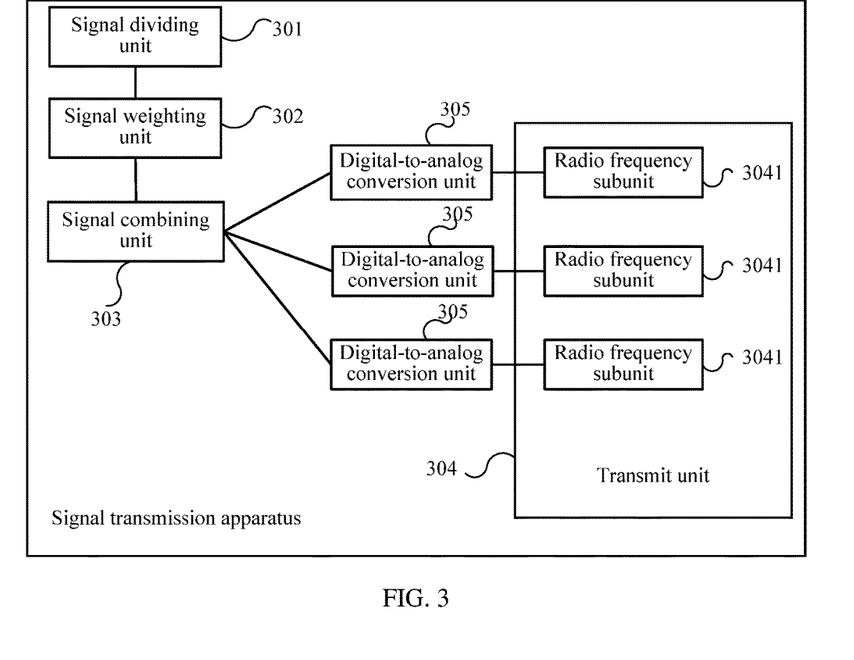
FIG. 3 is a schematic structural diagram of a signal transmission apparatus according to an embodiment.

An embodiment provides a signal transmission apparatus, as shown in FIG. 3, configured to transmit a downlink signal, where the downlink signal includes multiple downlink common channel signals.

The apparatus includes: a signal dividing unit 301, a signal weighting unit 302, a signal combining unit 303, and a transmit unit 304, where the transmit unit 304 includes k ($k\leq 2$) parallel radio frequency subunits 3041.

The signal dividing unit 301 may be configured to divide one downlink common channel signal in the multiple downlink common channel signals into N groups of grouped signals, where N represents a quantity of groups of grouped signals, and $N\leq 2$.

It is assumed that a downlink common channel signal is X. X may be divided into N groups ($N\geq 2$) and is expressed as: $X=[x_1, x_2, \ldots, x_n, \ldots, x_N]$ ($1\leq n\leq N$). The N groups of grouped signals are used for representing the downlink common channel signal, that is, information of X can still be completely represented after the grouped signals are superposed, and after undergoing weighting processing, the N groups of grouped signals can enable all radio frequency subunits of a system to transmit the N groups of grouped signals at full power.

Optionally, the signal dividing unit 301 may be further configured to perform, according to a quantity of subcarriers occupied by the one downlink common channel signal, frequency domain division on the one downlink common channel signal to obtain the N groups of grouped signals.

Optionally, the signal dividing unit 301 may be further configured to perform phase deflection on the one downlink common channel signal for N times, where a downlink common channel signal obtained after each time of phase deflection is used as one group of grouped signals, so as to obtain the N groups of grouped signals.

For specific descriptions of a frequency domain division or phase-change division method, refer to corresponding content in the method embodiment shown in FIG. 2, and the details are not described herein again.

By using the foregoing frequency domain division or phase-change division method, large space can be utilized in terms of signal phase and frequency, and there are multiple candidate division forms, which can fully adapt to the structure and performance of the system, and achieve a good signal division effect.

The signal weighting unit 302 is configured to perform, according to a weight vector that corresponds to each group of grouped signals in the N groups of grouped signals, signal weighting on the group of grouped signals to generate N first weighted signals, where the weight vector is used for adjusting amplitudes and phases of each group of grouped signals, so that the N first weighted signals meet a wide-beam forming condition.

The weight vector may include components corresponding to the k radio frequency subunits, and the signal weighting unit 302 may be specifically configured to generate N first weighted signals including k channels of first weighted sub-signals that correspond to the k radio frequency subunits 3041.

Selection of a weight vector is related to a setting and an attribute of an antenna array in the system. For example, different locations of antennas may lead to different physical properties of antennas or different shapes of formed beams.

Optionally, as another embodiment, that the signal weighting unit 302 is configured to generate N first weighted signals including k channels of weighted sub-signals that correspond to the k radio frequency subunits includes that: the k channels of first weighted sub-signals include at least one channel of effective first weighted sub-signal, the effective first weighted sub-signal includes an effective component, and the effective component includes a non-zero component in the weight vector or a component greater than a preset threshold.

For descriptions and examples of a detailed signal weighting process, refer to related content in the method embodiment shown in FIG. 2, and the details are not described herein again.

The signal combining unit 303 is configured to combine the N first weighted signals that correspond to the N groups of grouped signals to obtain a second weighted signal.

For a specific signal combining process, refer to related descriptions in the method embodiment shown in FIG. 2, and the details are not described herein again.

The transmit unit 304 may be configured to transmit the second weighted signal and includes the k parallel radio frequency subunits 3041, where k represents a quantity of radio frequency subunits, and k≤2. For clarity of illustration, there are a total of three radio frequency subunits 3041 in FIG. 3; however, the quantity of radio frequency subunits 3041 is merely used as an example and should not be construed as any limitation on this embodiment.

The radio frequency subunit 3041 may be configured to transfer a second weighted sub-signal included in the second weighted signal.

Specifically, the radio frequency subunit 3041 may perform processing such as filtering and amplification on a to-be-transmitted second weighted sub-signal and transfer a signal obtained after the processing to an air interface for transmission. For a specific structure and function, refer to an RRU path in the prior art.

Optionally, the apparatus further includes a digital-to-analog conversion unit 305 configured to perform to-analog processing on the second weighted signal and send an obtained analog signal to the transmit unit 304.

Specifically, k digital-to-analog conversion units 305 may be set; digital-to-analog conversion is performed on the second weighted signal for k times; obtained analog signals are correspondingly sent to the k radio frequency subunits 3041, transmitted through the air interface, and superposed in the air to form a wide beam; and the wide beam may be used for transmitting a downlink common channel signal and has relatively high signal coverage and relatively high beam gains. For clarity of illustration, there are a total of three digital-to-analog conversion units 305 corresponding to the radio frequency subunits 3041 in FIG. 3; however, the quantity of digital-to-analog conversion units 305 is merely used as an example and should not be construed as any limitation on this embodiment of the present invention.

By using the signal transmission apparatus provided in this embodiment, a downlink common channel signal that needs to be sent by using a wide beam is divided into multiple groups of grouped signals; for each group of grouped signals, signal weighting is separately performed on different radio frequency subunits in the apparatus; weighted grouped signals are combined to obtain a weighted downlink common channel signal; and the weighted downlink common channel signal is transmitted, so that a transmit power of each radio frequency path in a multi-antenna system is fully used, thereby increasing transmission gains of a wide beam, further increasing the coverage of the downlink common channel signal, improving the signal transmission effect, optimizing a system design, and avoiding a waste of resources.

Figure 4:
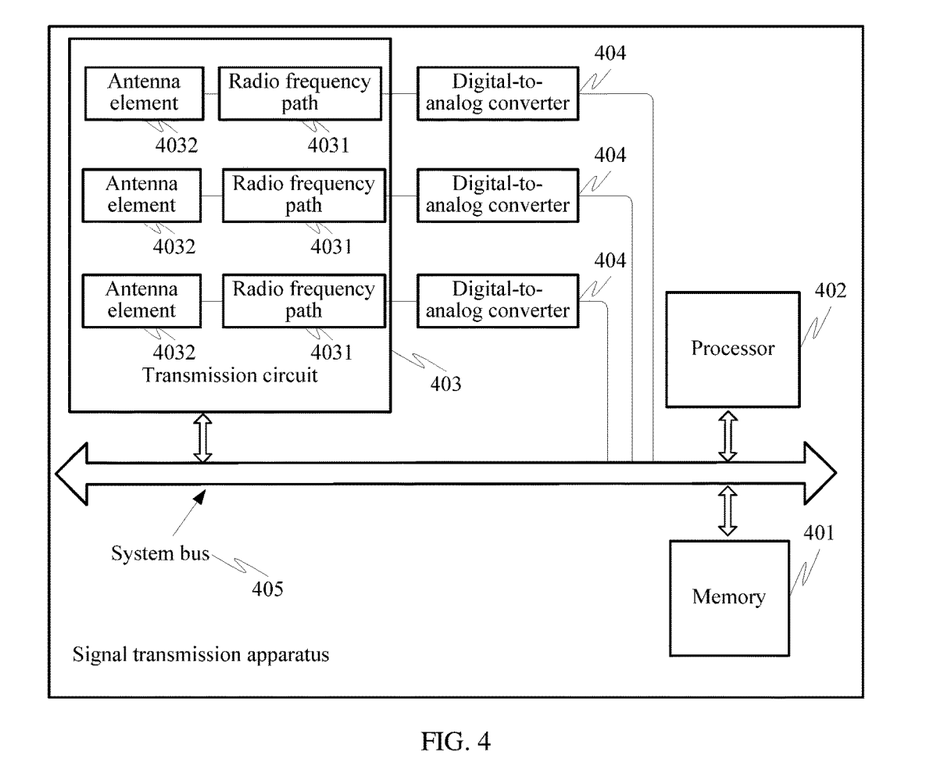
FIG. 4 is a schematic structural diagram of a signal transmission apparatus according to an embodiment.

An embodiment provides a signal transmission apparatus, as shown in FIG. 4, configured to transmit a downlink signal, where the downlink signal includes multiple downlink common channel signals.

The signal transmission apparatus includes a memory 401, a processor 402, and a transmission circuit 403, where the transmission circuit 403 includes k parallel radio frequency paths 4031, k represents a quantity of radio frequency paths, and k≤2. For clarity of illustration, there are a total of three radio frequency paths 4031 in FIG. 4; however, the quantity of radio frequency paths 4031 is merely used as an example and should not be construed as any limitation on this embodiment.

The memory 401 stores instructions enabling the processor 402 to perform the following operations: dividing one downlink common channel signal in the multiple downlink common channel signals into N groups of grouped signals, where N represents a quantity of groups of grouped signals, and N≥2; performing, according to a weight vector that corresponds to each group of grouped signals in the N groups of grouped signals, signal weighting on the group of grouped signals to generate N first weighted signals, where the weight vector is used for adjusting amplitudes and phases of each group of grouped signals, so that the N first weighted signals meet a wide-beam forming condition; combining the N first weighted signals that correspond to the N groups of grouped signals to obtain a second weighted signal; and transmitting the second weighted signal.

The weight vector may include components corresponding to the k radio frequency paths, and the memory 401 is further configured to store an instruction enabling the processor 402 to perform the following operation: generating N first weighted signals including k channels of first weighted sub-signals that correspond to the k radio frequency paths.

Selection of a weight vector is related to a setting and an attribute of an antenna array in the system. For example, different locations of antennas may lead to different physical properties of antennas or different shapes of formed beams.

Optionally, the memory 401 is further configured store an instruction enabling the processor 402 to perform the following operation: the k channels of first weighted sub-signals include at least one channel of effective first weighted sub-signal, the effective first weighted sub-signal includes an effective component, and the effective component includes a non-zero component in the weight vector or a component greater than a preset threshold.

For descriptions and examples of a detailed signal weighting process, refer to related content in the method embodiment shown in FIG. 2, and the details are not described herein again.

The transmission circuit 403 may be configured to transmit the second weighted signal.

The radio frequency path 4031 may be configured to transfer a second weighted sub-signal included in the second weighted signal.

Specifically, the radio frequency paths 4031 may perform processing such as filtering and amplification on a to-be-transmitted second weighted sub-signal and transfer a signal obtained after the processing to an air interface for transmission. For a specific structure and function, refer to an RRU path in the prior art.

The transmission circuit 403 may further include an antenna element 4032 driven by the radio frequency paths 4031. There is a correspondence between a quantity of antenna elements and a quantity of radio frequency paths, for example, one-driving-one, or two-driving-four. A one-driving-one multi-antenna system is used for description in this embodiment but should not be construed as any limitation on the present invention. For clarity of illustration, there are a total of three antenna elements 4032 corresponding to the radio frequency paths 4031 in FIG. 4; however, the quantity of antenna elements 4032 is merely used as an example and should not be construed as any limitation on this embodiment.

The apparatus may further include a digital-to-analog signal converter (digital-to-analog converter for short) 404 configured to perform to-analog processing on the second weighted signal and send an obtained analog signal to the transmission circuit.

Specifically, k digital-to-analog converters 404 may be set, digital-to-analog conversion is performed on the second weighted signal for k times; obtained analog signals are correspondingly sent to the k radio frequency paths 4031, transmitted through the air interface, and superposed in the air to form a wide beam; and the wide beam may be used for transmitting a downlink common channel signal and has relatively high signal coverage and relatively high beam gains.

For clarity of illustration, there are a total of three digital-to-analog converters 404 corresponding to the radio frequency paths 4031 in FIG. 4; however, the quantity of digital-to-analog converters 404 is merely used as an example and should not be construed as any limitation on this embodiment.

Optionally, the memory 401 may further store the following instruction: performing, according to a quantity of subcarriers occupied by the one downlink common channel signal, frequency domain division on the one downlink common channel signal.

Optionally, the memory 401 may further store the following instruction: performing phase deflection on the one downlink common channel signal for N times, where a downlink common channel signal obtained after each time of phase deflection is used as one group of grouped signals.

For specific descriptions of a frequency domain division or phase-change division method, refer to corresponding content in the method embodiment shown in FIG. 2, and the details are not described herein again.

By using the foregoing frequency domain division or phase-change division method, large space can be utilized in terms of signal phase and frequency, and there are multiple candidate division forms, which can fully adapt to the structure and performance of the system, and achieve a good signal division effect.

The processor 402 may execute the foregoing instructions stored in the memory 401. Specifically, the processor 402 controls operation of the signal transmission apparatus provided in this embodiment, and the processor 402 may also be referred to as a CPU (Central Processing Unit). The memory 401 may include a read-only memory and a random access memory and provides instructions and data to the processor 402. Part of the memory 401 may further include a non-volatile random access memory (NVRAM). In a specific application, the components of the apparatus are coupled together by using a bus system 405, where the bus system 405 includes a data bus, and may further include a power bus, a control bus, a status signal bus, and the like. However, for clarity of description, all the buses in this figure are marked as the bus system 405.

The method disclosed in the foregoing embodiments may be applied to the processor 402 or implemented by the processor 402. The processor 402 may be an integrated circuit chip and has a signal processing capability. In an implementation process, all the steps in the foregoing method may be completed by an integrated logic circuit in a hardware form or by instructions in a software form in the processor 402. The foregoing processor 402 may be a general purpose processor, a digital signal processor (DSP), an application-specific integrated circuit (ASIC), a field programmable gate array (FPGA) or another programmable logical device, a discrete gate or transistor logical device, or a discrete hardware assembly. All the methods, steps, or logical block diagrams disclosed in the embodiments of the present invention may be implemented or executed. The general purpose processor may be a microprocessor or may be any normal processor or the like. The steps of the method disclosed in the embodiments of the present invention may be directly completed by a decoding processor in a hardware form or may be completed by using a combination of hardware and software modules in a decoding processor. The software module may be located on a storage medium mature in the art, such as a random access memory, a flash memory, a read-only memory, a programmable read-only memory or an electrically erasable programmable memory, or a register. The storage medium is located on the memory 401, and the processor 402 reads information in the memory 401 and completes the steps of the foregoing method by using hardware of the processor 402.

By using the signal transmission apparatus in this embodiment of the present invention, a downlink common channel signal that needs to be sent by using a wide beam is divided into multiple groups of grouped signals; for each group of grouped signals, signal weighting is separately performed on different radio frequency paths in the apparatus; weighted grouped signals are combined to obtain a weighted downlink common channel signal; and the weighted downlink common channel signal is transmitted, so that a transmit power of each radio frequency path in a multi-antenna system is fully used, thereby increasing transmission gains of a wide beam, further increasing the coverage of the downlink common channel signal, improving the signal transmission effect, optimizing the system design, and avoiding waste of resources.

It is easily understood that the signal transmission apparatuses described in FIG. 3 and FIG. 4 above may execute the downlink signal transmission method in the embodiment shown in FIG. 2. For convenient and concise descriptions, for the specific working processes of the devices described in FIG. 3 and FIG. 4 above, refer to the corresponding method process of the method embodiment shown in FIG. 2, and the details are not described herein again.

Figure 5:
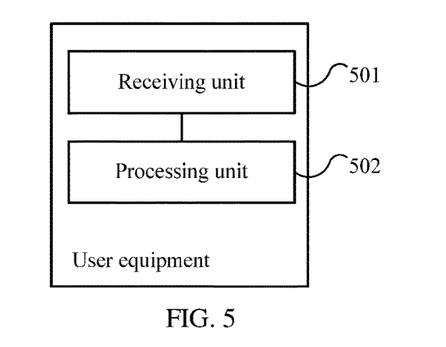
FIG. 5 is a schematic structural diagram of a user equipment according to an embodiment.

An embodiment further provides a user equipment shown in FIG. 5. The user equipment includes a receiving unit 501, configured to receive a second weighted signal sent by a base station, where the second weighted signal is obtained by combining N first weighted signals, the N first weighted signals correspond to N groups of grouped signals, the N groups of grouped signals are obtained by dividing one downlink common channel signal in multiple downlink common channel signals, N represents a quantity of groups of grouped signals, and N≥2; the N first weighted signals are obtained by performing, according to a weight vector that corresponds to each group of grouped signals in the N groups of grouped signals, signal weighting on the group of grouped signals that corresponds to the weight vector, where the weight vector is used for adjusting amplitudes and phases of each group of grouped signals, so that the first weighted signals meet a wide-beam forming condition; and a processing unit 502, acquiring system information comprised in the second weighted signal.

Figure 6:
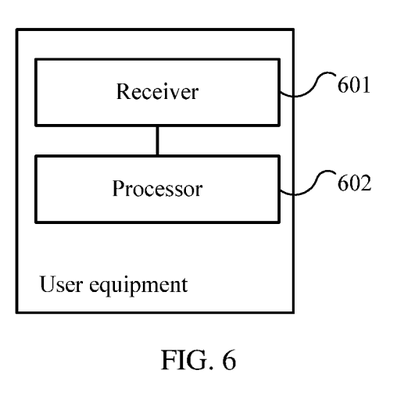
FIG. 6 is a schematic structural diagram of a user equipment according to an embodiment.

An embodiment further provides a user equipment shown in FIG. 6. The user equipment includes a receiver 601, configured to receive a second weighted signal sent by a base station, where the second weighted signal is obtained by combining N first weighted signals, the N first weighted signals correspond to N groups of grouped signals, the N groups of grouped signals are obtained by dividing one downlink common channel signal in multiple downlink common channel signals, N represents a quantity of groups of grouped signals, and N≥2; the N first weighted signals are obtained by performing, according to a weight vector that corresponds to each group of grouped signals in the N groups of grouped signals, signal weighting on the group of grouped signals that corresponds to the weight vector, where the weight vector is used for adjusting amplitudes and phases of each group of grouped signals, so that the first weighted signals meet a wide-beam forming condition; and a processor 602, acquiring system information comprised in the downlink signal.

It can be understood that a downlink common channel signal received by a user equipment in the embodiment shown in FIG. 5 or FIG. 6 above may be transmitted by a signal transmission apparatus in the embodiment shown in FIG. 3 or FIG. 4 or may be obtained by means of processing by using a downlink signal transmission method in the embodiment shown in FIG. 2. For related content, refer to descriptions in other embodiments, and the details are not described herein again.

By using the user equipment provided in this embodiment, a wide-beam signal with high transmission gains is received, so that system information in a downlink common channel signal can be more accurately parsed out, thereby enhancing receiving and processing capabilities.

It should be understood that sequence numbers of the foregoing processes do not mean execution sequences in various embodiments. The execution sequences of the processes should be determined according to functions and internal logic of the processes, and should not be construed as any limitation on the implementation processes of the embodiments.

Based on the foregoing descriptions of the embodiments, a person skilled in the art may clearly understand that the present invention may be implemented by software in addition to a necessary universal hardware platform or by hardware only. In most circumstances, the former is a preferred implementation manner. Based on such an understanding, the technical solutions of the present invention essentially, or the part contributing to the prior art may be implemented in a form of a software product. The software product is stored in a storage medium, and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

In several embodiment provided in this application, it should be understood that the system, the device and the method that are disclosed may be implemented in another manner without exceeding a scope of this application. For example, the described base station embodiment is merely exemplary. For example, the module or unit division is merely logical function division and may be other division in actual implementation. For example, a plurality of units or components may be combined or integrated into another system, or some features may be ignored or not performed. The units described as separate parts may or may not be physically separate, and parts displayed as units may or may not be physical units, may be located in one position, or may be distributed on a plurality of network units. Some or all of the modules may be selected according to actual needs to achieve the objectives of the solutions of the embodiments. A person of ordinary skill in the art may understand and implement the embodiments of the present invention without creative efforts.

In addition, the described system, device, and method and schematic diagrams of different embodiments may be combined or integrated with another system, module, technology, or method without exceeding a scope of this application. In addition, the displayed or discussed mutual couplings or direct couplings or communication connections may be implemented through some interfaces. The indirect couplings or communication connections between the base stations or units may be implemented in electronic, mechanical, or other forms.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. An apparatus, comprising:
   a memory;
   a processor; and
   a transmission circuit;
   wherein the apparatus is configured to transmit a downlink signal, the downlink signal comprising a plurality of downlink common channel signals;
   wherein the transmission circuit comprises k parallel radio frequency paths, k represents a quantity of radio frequency paths, and k≥2; and
   wherein the memory is configured to store instructions enabling the processor to perform the following:
      dividing a downlink common channel signal in the plurality of downlink common channel signals into N groups of grouped signals, wherein N represents a quantity of groups of grouped signals, and N≥2;
      performing, according to a weight vector that corresponds to each group of grouped signals in the grouped signals, signal weighting on the group of grouped signals to generate N first weighted signals, wherein the weight vector is used for adjusting amplitudes and phases of each group of grouped signals, so that the first weighted signals meet a wide-beam forming condition;
      combining the N first weighted signals that correspond to the N groups of grouped signals to obtain a second weighted signal; and
      transmitting the second weighted signal using the k parallel radio frequency paths of the transmission circuit.

2. The apparatus according to claim 1, wherein the weight vector comprises components corresponding to the k parallel radio frequency paths; and
   wherein the memory is configured to store instructions that further enable the processor to perform the following: generating N first weighted signals comprising k channels of first weighted sub-signals that correspond to the k parallel radio frequency paths.

3. The apparatus according to claim 2, wherein the k channels of first weighted sub-signals comprise a channel of an effective first weighted sub-signal, the effective first weighted sub-signal comprises an effective component, and the effective component comprises a non-zero component in the weight vector.

4. The apparatus according to claim 2, wherein the k channels of first weighted sub-signals comprise a channel of an effective first weighted sub-signal, the effective first weighted sub-signal comprises an effective component, and the effective component comprises a component greater than a preset threshold.

5. The apparatus according to claim 2, wherein the memory is further configured to store instructions enabling the processor to perform the following:
   performing phase deflection on the downlink common channel signal for N times, wherein a downlink common channel signal obtained after each performing of the phase deflection is a group of grouped signals, so as to obtain the N groups of grouped signals.

6. The apparatus according to claim 2, further comprising a digital-to-analog signal converter, wherein the digital-to-analog signal converter is configured to perform to-analog processing on the second weighted signal and to send an obtained analog signal to the transmission circuit.

7. The apparatus according to claim 1, wherein a radio frequency path is configured to transfer a second weighted sub-signal comprised in the second weighted signal.

8. The apparatus according to claim 1, wherein the memory is further configured to store instructions enabling the processor to perform the following: performing, according to a quantity of subcarriers occupied by the downlink common channel signal, frequency domain division on the downlink common channel signal to obtain the N groups of grouped signals.

9. A method, applied to a multi-antenna system, wherein the multi-antenna system comprises k parallel radio frequency paths, k represents a quantity of radio frequency paths, k≥2, the method is used for transmitting a downlink signal, the downlink signal comprises a plurality of downlink common channel signals, and the method comprises:
   dividing a downlink common channel signal in the plurality of downlink common channel signals into N groups of grouped signals, wherein N represents a quantity of groups of grouped signals, and N≥2;
   performing, according to a weight vector that corresponds to each group of grouped signals in the N groups of grouped signals, signal weighting on the group of grouped signals to generate N first weighted signals, wherein the weight vector is used for adjusting amplitudes and phases of each group of grouped signals, so that the N first weighted signals meet a wide-beam forming condition;
   combining the N first weighted signals that correspond to the N groups of grouped signals to obtain a second weighted signal; and
   transmitting the second weighted signal.

10. The method according to claim 9, wherein the weight vector comprises components corresponding to the k parallel radio frequency paths; and
   wherein generating the N first weighted signals comprises generating N first weighted signals comprising k channels of first weighted sub-signals that correspond to the k parallel radio frequency paths.

11. The method according to claim 10, wherein generating N first weighted signals comprising k channels of first weighted sub-signals that correspond to the k parallel radio frequency paths comprises:
   the k channels of first weighted sub-signals comprise a channel of effective first weighted sub-signal, the effective first weighted sub-signal comprises an effective component, and the effective component comprises a non-zero component in the weight vector or a component greater than a preset threshold.

12. The method according to claim 9, wherein transmitting the second weighted signal comprises:
   transferring, using a corresponding radio frequency path, a second weighted sub-signal comprised in the second weighted signal.

13. The method according to claim 9, wherein dividing the downlink common channel signal in the plurality of downlink common channel signals into N groups of grouped signals comprises:
   performing, according to a quantity of subcarriers occupied by the downlink common channel signal, frequency domain division on the downlink common channel signal to obtain the N groups of grouped signals.

14. The method according to claim 9, wherein dividing the downlink common channel signal in the plurality of downlink common channel signals into N groups of grouped signals comprises:
   performing phase deflection on the downlink common channel signal for N times, wherein a downlink common channel signal obtained after each performing of phase deflection is used as one group of grouped signals, so as to obtain the N groups of grouped signals.

15. The method according to claim 9, wherein before transmitting the second weighted signal, the method further comprises: performing digital-to-analog processing on the second weighted signal.

16. A system, comprising:
   a base station, comprising a memory, a processor, and a transmission circuit; and
   a user equipment;
   wherein the base station is configured to transmit a downlink signal, the downlink signal comprising a plurality of downlink common channel signals;
   wherein the transmission circuit of the base station comprises k parallel radio frequency paths, k represents a quantity of radio frequency paths, and k≥2; and
   wherein the memory of the base station is configured to store instructions enabling the processor of the base station to:
      divide a downlink common channel signal in the plurality of downlink common channel signals into N groups of grouped signals, wherein N represents a quantity of groups of grouped signals, and N≥2;
      perform, according to a weight vector that corresponds to each group of grouped signals in the grouped signals, signal weighting on the group of grouped signals to generate N first weighted signals, wherein the weight vector is used for adjusting amplitudes and phases of each group of grouped signals, so that the first weighted signals meet a wide-beam forming condition;
      combine the N first weighted signals that correspond to the N groups of grouped signals to obtain a second weighted signal; and
      transmit the second weighted signal to the user equipment using the k parallel radio frequency paths of the transmission circuit of the base station; and
   wherein the user equipment comprises a receiver, and the receiver is configured to receive the second weighted signal sent by the base station.

17. The system according to claim 16, wherein the weight vector comprises components corresponding to the k parallel radio frequency paths; and
   wherein the memory of the base station is configured to store instructions that further enable the processor of the base station to: generate N first weighted signals comprising k channels of first weighted sub-signals that correspond to the k parallel radio frequency paths.

18. The system according to claim 17, wherein the k channels of first weighted sub-signals comprise a channel of an effective first weighted sub-signal, the effective first weighted sub-signal comprises an effective component, and the effective component comprises a non-zero component in the weight vector.

* * * * *